United States Patent [19]

Schreiter, Jr.

[11] 4,428,677
[45] Jan. 31, 1984

[54] HOPPER FOR MIXER UNIT OF A CONCRETE TRANSPORT VEHICLE

[75] Inventor: Paul W. Schreiter, Jr., St. Louis, Mo.

[73] Assignee: Concrete Transport Mixer Co., St. Louis, Mo.

[21] Appl. No.: 365,007

[22] Filed: Apr. 2, 1982

[51] Int. Cl.³ ............................ B28C 5/20; B28C 5/42
[52] U.S. Cl. ........................................ 366/41; 366/68
[58] Field of Search ................... 366/32, 33, 41, 37, 366/68, 181, 183, 30; 414/468, 523; 193/10, 25 C, 24, 2 A

[56] References Cited

U.S. PATENT DOCUMENTS

| 2,331,037 | 10/1943 | McMillan | 366/41 X |
| 2,360,345 | 10/1944 | Hilkemeier | 366/41 |
| 2,544,083 | 3/1951 | Hawkins . | |
| 2,589,492 | 3/1952 | Graham | 366/41 |
| 3,190,621 | 6/1965 | Green et al. . | |
| 3,799,221 | 3/1974 | Vincent . | |
| 4,318,621 | 3/1982 | Lawrence et al. | 366/41 |

Primary Examiner—Philip R. Coe
Attorney, Agent, or Firm—Gravely, Lieder & Woodruff

[57] ABSTRACT

The mixer unit of a concrete transport vehicle has a loading hopper constructed in two sections which are connected together at a hinge joint. The one section is attached firmly to the frame of the mixer unit, and this section is located opposite to the opening at the elevated end of the mixer drum. The other section moves about the hinge axis from an extended position to a storage position. When in the extended position, the movable section forms an upward continuation of the fixed section, and the hopper has extended height to facilitate loading concrete mix into the drum. When in the storage position, the movable section is positioned to the rear of the fixed section and is carried entirely below the upper margin of the fixed section. This reduces the height of the mixer unit, enabling the transport vehicle to maneuver in areas where the overhead clearance is relatively low.

14 Claims, 6 Drawing Figures

HOPPER FOR MIXER UNIT OF A CONCRETE TRANSPORT VEHICLE

BACKGROUND OF THE INVENTION

This invention relates in general to vehicles for transporting concrete, and more particularly to hoppers through which the mixer units of such vehicles are loaded with concrete.

The typical mixer unit for a concrete transport vehicle has a large drum that rotates about an inclined axis, this drum being larger at its lower end than at its upper end and further having an opening at its upper end. In addition, the typical mixer unit has a hopper located adjacent to the opening at the upper end of the drum for directing concrete mix from a loading facility into the drum. Immediately below the hopper, the vehicle is also provided with a discharge chute into which the drum discharges the concrete so that it may be directed to a desired location at a construction site. Of course the vehicle has a mechanism for rotating the drum, and when turned in one direction the drum merely churns the concrete mix so that it does not set. However, when turned in the opposite direction, the drum pumps the concrete into the discharge chute which in turn directs it to the desired location.

While all mixer units are basically the same, they are manufactured in a wide range of capacities, and generally speaking the height of the transport vehicle increases with capacity. As a consequence, the loading facilities are constructed to accommodate the largest, or more accurately the tallest, of the vehicles.

In this regard, the typical loading facility is usually a drive-through arrangement which enables the hopper on the mixer unit of the vehicle to be brought into alignment with an elevated chute at the facility. The concrete mix flows out of this chute and into the hopper, which in turn directs the mix into the drum. With vehicles of large capacity, the hopper locates close to the lower end of the elevated chute at the facility, and little if any concrete is lost. In the case of vehicles with small capacity, the vehicle hopper is often considerably below the elevated chute at the facility, and this makes it difficult for the driver to align the hopper with the elevated chute. Also, even when properly aligned, wind has a tendency to blow the mix away from the hopper as the mix passes between the lower end of the chute and the upper end of the hopper. Some smaller capacity vehicles overcome this problem with hoppers of extended height. These hoppers project considerably above the highest portions of their respective drums, and in effect extend the height of the smaller capacity vehicles to that of the larger capacity vehicles. This, however, eliminates one major advantage of the smaller capacity vehicles, namely the ability to bring concrete to areas where the overhead clearance is relatively low.

For example, most manufacturing plants and warehouses of current construction are only a single story high and have concrete slabs for floors. These floors are usually poured after the walls and roof of the building have been erected, and is is not unusual for the ceiling to be at a height incapable of accommodating large capacity transport vehicles. Thus, it is desirable to bring the concrete to the site in a vehicle of small capacity that has its hopper low enough so as not to interfere with the ceiling.

SUMMARY OF THE INVENTION

One of the principal objects of the present invention is to provide a concrete mixer unit for enabling concrete transport vehicles to efficiently utilize loading facilities designed for vehicles having large capacity mixer units. Another object is to provide a mixer unit of the type stated with a hopper having connected sections, the one section being capable of being lowered with respect to the other section so as to minimize the overall height of the transport vehicle. A further object is to provide a hopper of the type stated in which the one hopper section folds relative to the other section. An additional object is to provide a hopper of the type stated which is simple in construction and inexpensive to manufacture. These and other objects and advantages will become apparent hereinafter.

The present invention resides in a hopper for loading the drum of a concrete mixer unit with concrete and includes first and second sections. The first section has an open top and an opening at its lower end, with that opening being directed toward the interior of the mixer drum. The second section moves between extended and storage positions with respect to the first section. When in its extended position, the second section forms an upward continuation of the first section. When in its storage position, the second section is positioned below the open upper end of the first section. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
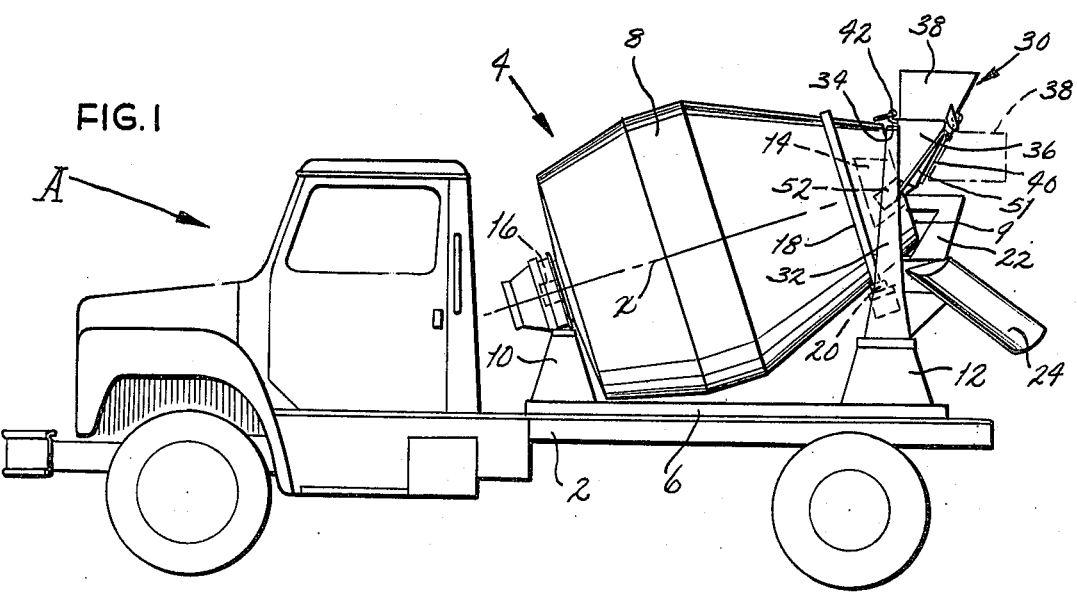
FIG. 1 is a side elevational view of a concrete transport vehicle provided with a mixer unit having a hopper constructed in accordance with and embodying the present invention.

Referring now to the drawings, a concrete transport vehicle A (FIG. 1) includes a conventional truck chassis 2 and a concrete mixer unit 4 that is mounted upon the truck chassis 2. While the size of the mixer unit 4 is not critical, it is contemplated that it will be of relatively small capacity, in which case the height of the vehicle A will be relatively small. Thus, it can pass into a loading facility designed for larger capacity vehicles with considerable clearance at the top of the vehicle. By the same token, the vehicle A can deliver concrete to areas where the overhead clearance is quite small, and as such can service many areas where larger concrete transport vehicles cannot maneuver.

The mixer unit 4 includes (FIG. 1) the usual frame 6 which is bolted to the truck chassis 2, and the mixer frame 6 in turn supports a drum 8 which rotates about an inclined axis X. The drum 8 is cylindrical in part and frustoconical in part, its large generally cylindrical end being closed, while the small end of the frustoconical section forms an opening 9 that is concentric to the axis X and leads into the interior of the drum 8. Internally, the drum 8 has spiral vanes which lead up to a cone 14 that is within the opening 9 at the end of the conical section, the cone 14 being hollow and smaller in diameter than, yet concentric with, the opening 9. When the drum 8 is turned in one direction, the vanes churn the mix within the drum 8 and thereby prevent that mix from setting. However, when the drum 8 is turned in the opposite direction, the vanes pump the mix upwardly and out of the opening 9. To support the drum 8, the mixer frame 6 has forward and rear pedestals 10 and 12. The forward pedestal 10 lies ahead of the drum 8, and the large cylindrical end of the drum 8 is connected to the pedestal 10 by means of a trunnion 16. At the opposite end of the drum 8, the conical section is fitted with a roller track 18 that rests on rollers 20 which in turn are supported on the rear pedestal 12.

In addition, the mixer unit 4 has a discharge spout 22 (FIG. 1) which is attached to the rear pedestal 12 and is located directly below the rearwardly presented opening 9 at the small end of the conical section for the drum 8. Thus, when the drum 8 is turned in the proper direction, the concrete mix within is pumped out of the annular space between the rim of the drum opening 9 and the cone 14 that lies within the opening 9, and this mix flows into the spout 22. The lower end of the spout 22 in turn aligns with a discharge chute 24 which is supported on the mixer frame 6 such that it can pivot laterally as well as upwardly and downwardly and this enables the concrete mix which flows from the spout 22 to the chute 24 to be directed to a desired location at the rear of the transport vehicle A.

The foregoing components of the mixer unit 4 are conventional and will therefore not be considered in detail.

Aside from the foregoing conventional components, the mixer unit 4 is provided with an extendable hopper 30 (FIG. 1) that is attached to a support 32 which extends upwardly from the rear pedestal 12 for the frame 6. The upper end of the support 32 constitutes a cross piece 34 which lies immediately behind the rearwardly presented opening 9 at the small end of the conical section for the drum 8, it being offset from, yet quite close to, the upper margin of the opening 9. In any event, the cross piece 34 does not obstruct the hollow interior of the cone 14 that is within the opening 9 of the drum 8. The hopper 30 includes (FIGS. 2-4) a lower or fixed section 36 that is attached firmly to the support 32, an upper or movable section 38 that is pivoted on the fixed section 36 for movement from an extended position wherein it aligns with the fixed section 36 to a storage position wherein it is behind the fixed section 36, a counter-balancing assembly 40 which, despite the weight of the movable section 38, makes it relatively easy to move the section 38 between its two positions, and a locking mechanism 42 for securing the movable section 38 in its extended position.

Turning now to the fixed section 36 (FIGS. 2-4), it has a flat front wall 44, the side margins of which converge downwardly. In addition, the fixed section has flat side walls 46, which are welded to the front wall along the side margins thereof, and a curved back wall 48 which is spaced rearwardly from the front wall 44. Actually, the side and back walls 46 and 48 are formed from a single sheet of metal and the curvature of the back wall 48 is such that the back wall 48 merges into the side walls 46 at gentle contours. By reason of the taper along the sides of the front wall, the two side walls 46 converge downwardly, and the back wall 48, likewise converges downwardly toward the front wall 44. Thus, the front, side and back walls 44, 46 and 48 enclose a funnel-shaped cavity that is much larger at its open upper end than at its lower end.

The fixed section 36 is attached to the support 32 by a horizontal bracket 50 (FIGS. 2-4) which extend along its front wall 44 slightly below the upper margin of that wall. The bracket 50, which is welded securely to the front wall 44, projects forwardly from the wall 44 and overlies the cross piece 34 of the hopper support 32 to which it is bolted (FIG. 1). The fixed section 36 is further supported by struts 51 which extend upwardly from the sides of the support 32 and are connected with the fixed section 36 near the upper margins of the curved junctures between the side and back walls 46 and 48. When the bracket 50 is attached to the cross piece 34 of the support 32 and the struts 51 are in place, the front wall 44 of the fixed section 36 lies in a vertical disposition immediately behind the opening 9 at the small end of the conical section for the drum 8, or at least opposite the upper portion of that opening. Also the upper margins of the walls 44, 46 and 48 lie in a horizontal plane that is about at the same elevation as the highest portion of the drum 8.

While all of the walls 44, 46 and 48 converge downwardly, they do not meet at their lower ends, but instead the lower ends of the side wall 46 and the back wall 48 are joined to an entry spout 52 (FIGS. 2-4) which projects forwardly beyond the front wall 44 at an oblique angle with respect to the front wall 44. Indeed, the entry spout 52 aligns with and projects into the cone 14 at the center of the opening 9 in the small end of the drum 8 (FIG. 1). Moreover, the front wall 44 at its bottom is cut away somewhat so that a forwardly presented spout opening 53 (FIG. 3) exists along the entry spout 52, that opening being presented toward the cone 14 at the end of the drum 8. Along the sides of the spout opening 53 are gussets 54, which are actually welded between the front wall 44 and the spout 52 to reinforce the spout 52. Thus, any cement mix which is introduced into the upper end of the fixed section 36 will be channelled to the spout 52 which in turn will direct it into the cone 14 at the center of the opening 9 in the drum 8.

Figure 2:
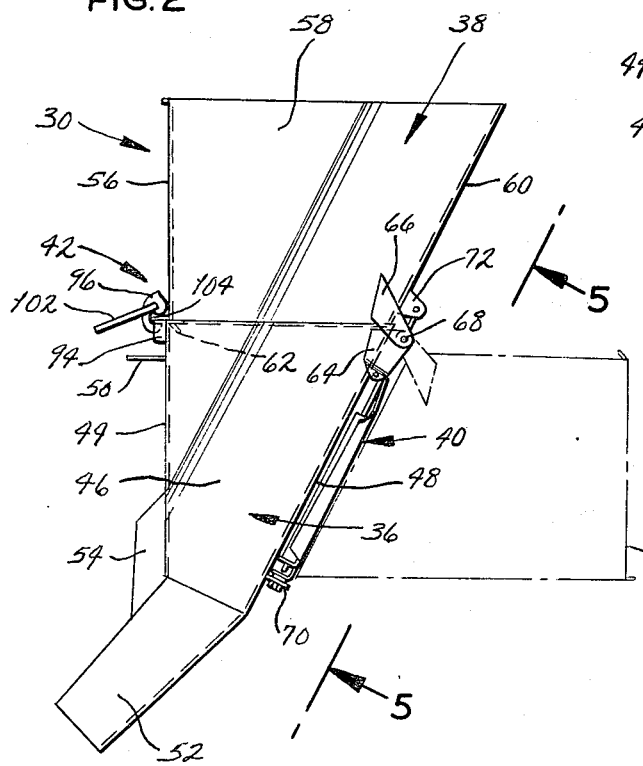
FIG. 2 is an enlarged side elevational view of the hopper with its movable section being in the extended position, but further being illustrated in phantom lines to show its storage position.
Figure 3:
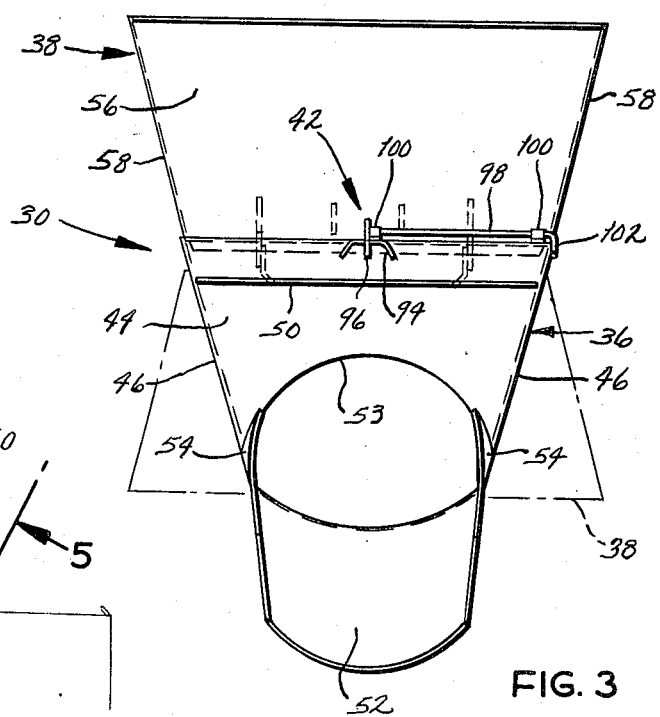
FIG. 3 is a front elevational view of the hopper, again with its movable section in the extended position, but further illustrated in phantom lines in its storage position.
Figure 4:
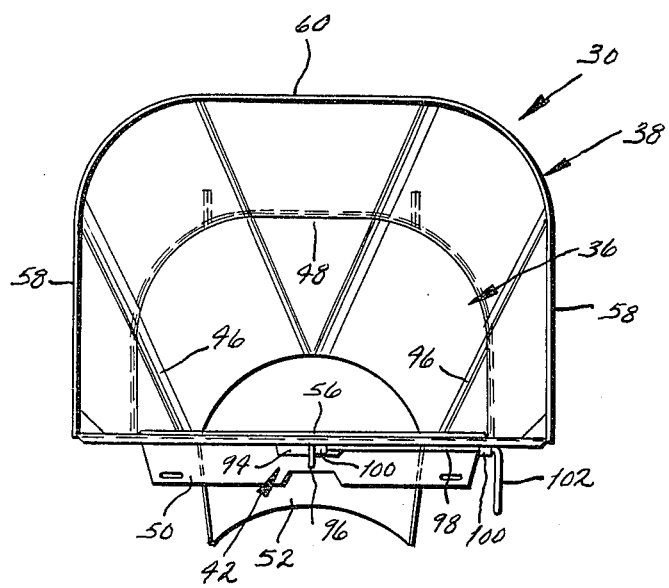
FIG. 4 is a top plan view of the hopper with its movable section in the extended position.

The movable section 38 of the hopper 30 is hinged to the fixed section 36, and when in its extended position, it forms an upward extension of the fixed section 36 (FIGS. 2-4). Like the lower section 36, the upper section 38 is funnel-shaped, it having a flat front wall 56, flat side walls 58 and a curved back wall 60, all of which are disposed at the same inclination as their counterparts in the fixed section 36. Moreover, the back wall 60 has the same contour as the underlying back wall 48 for the fixed section 36. The upper margins of the front, side, and back walls 56, 58 and 60 of the movable section lie in a common plane, as do the lower margins of the side and back walls 58 and 60, these planes being parallel, and when the movable section 38 is in either its extended or its storage position, these planes lie in a horizontal disposition. Indeed, when the movable section 36 is in its extended position, the lower margins of its side and back walls 58 and 60 coincide with the upper margins of the side and back walls 46 and 48 of the fixed section 36. In contrast, the front wall 56 of the movable section 38 projects beyond the plane of the lower margins for the side and back walls 46 and 48 where it is turned rearwardly slightly in the form of a lip 62, which will project into the interior of the fixed section 36 along the front wall 44 when the movable section 38 is in its extended position. The sides of the lip 62 are beveled slightly, and this enables the lip 62 to guide the movable section 38 into alignment with the fixed section 36 as the former is moved to its extended position.

The fixed section 36 along the back wall 48 thereof is provided with a pair of hinge plates 64 (FIG. 2) which are spaced apart and located slightly below the upper margin thereof. Similarly, the movable section 38, along its back wall 60 is provided with more hinge plates 66 which project rearwardly and slightly downwardly past the lower margin of the wall 60 such that the ends of the two plates 66 lie immediately outwardly from the hinge plates 64 on the fixed section 36. Thus, the hinge plates 64 and 66 are arranged in sets at the rear of the hopper 30. Extended through each set of hinge plates 64 and 66 is a hinge pin 68, and the two pins 68 lie along a common axis that is horizontal and parallel to the back walls 48 and 60.

In effect, the hinge plates 64 and 66 together with the hinge pins 68 form hinges which enable the movable section 38 to fold between the extended position and a storage position. When in the extended position, the movable section 38 rests on top of the fixed section 36 and forms a funnel-like continuation of it. In other words, when the movable section 38 is in its extended position, its front, side and back walls 56, 58 and 60 lie in the same planes as the respective front, side and back walls 44, 46 and 48, of the fixed section 36. On the other hand, when the movable section 38 is in its storage position, it lies entirely to the rear of the fixed section 36 with its back wall 60 being presented toward and parallel to the back wall 48 of the fixed section 36. Moreover, the two back walls 48 and 60 are quite close together, and the upper and lower margins of the movable section 38 lie in horizontal planes which are below the plane defined by the upper margin of the fixed section 36. In short, the movable section 38 when in its storage position is located entirely below the upper margins of the fixed section 36. Actually, when the movable section 38 is in its storage position, its back wall 60 bears against the counterbalancing assembly 40, which for the most part is along the back wall 48 of the fixed section 36.

Figure 5:
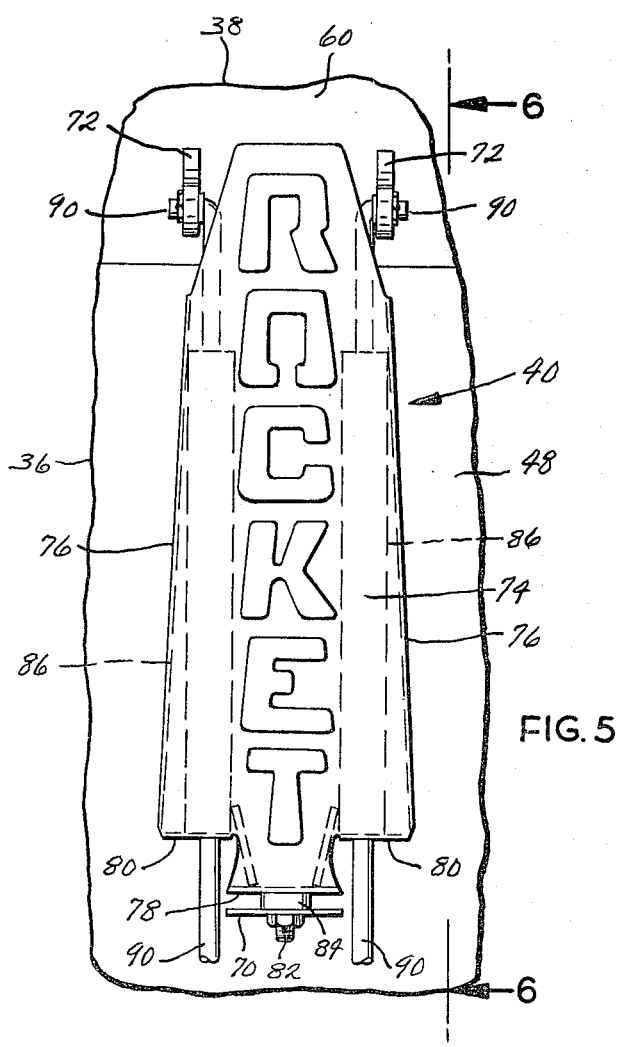
FIG. 5 is a rear elevational view of the counterbalancing assembly for the hopper taken along line 5—5 of FIG. 2.
Figure 6:
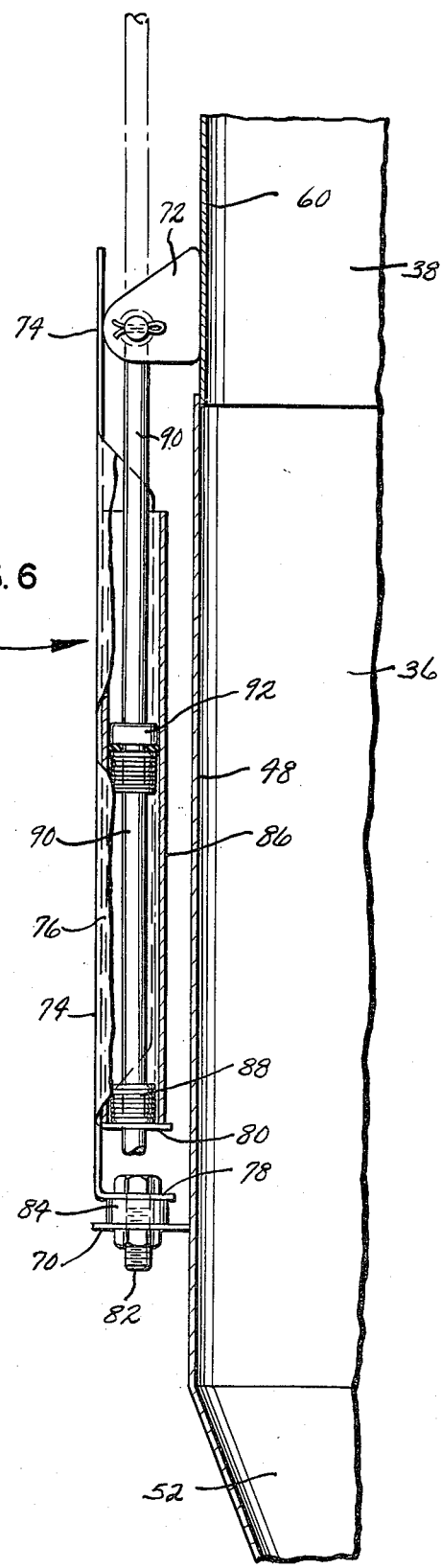
FIG. 6 is a side elevational view, partially broken away and in section, of the counterbalancing assembly taken along line 6—6 of FIG. 5.

The movable section 38, being formed from steel sheet, would be quite difficult to move from its storage position to its extended position were it not for the counterbalancing assembly 40. That assembly for the most part lies along the back wall 48 of the fixed section 36 (FIGS. 2, 5 & 6), and extends between a rearwardly extending tab 70 on the back wall 48 near the lower end thereof and a pair of tabs 72 that project rearwardly from the back wall 60 of the movable section 38, the tabs 72 being set inwardly from the hinge plates 64 and 66 that form the hinge connection between the hopper sections 36 and 38.

The counterbalancing assembly 40 includes a carrier plate 74 (FIGS. 5 & 6) that for the most part lies parallel to the back wall 48 of the fixed section 36, but along its sides is turned forwardly in the provision of flanges 76 which rigidify the plate 74. In addition, the plate 74 is turned inwardly at its lower end to provide a center mounting tab 78 and a pair of guide tabs 80 that are offset laterally from the center tab 78. The mounting tab 76 is fitted with a bolt 82 which is welded to it, and the bolt 82 in turn extends through the tab 70 at the lower end of the back wall 48, there being an elastomeric collar 84 between the two tabs 70 and 78.

Extended upwardly from the guide tabs 80 are spring tubes 86 (FIG. 6) which are secured to the plate 74 at its tabs 80 and also along its flanges 76. The tubes 86 contain coil-type compression springs 88 and push rods 90 on which the springs 88 act. The rods 90 are considerably longer than the tubes 86, and at the lower ends of the tubes 86, the rods 90 project through holes in the guide tabs 80, so the tabs 80 maintain the rods 90 concentric with the lower ends of the tubes 86. The rods 90 are maintained concentric with the upper ends of the tubes 86 by collars 92 which are fitted around and secured to the rods 90 within the confines of the tubes 86. The diameter of the collars 92 is slightly less than the inside diameter of the tubes 86 so that the rods 90 slide easily within the tubes 86. The spring 88 for each tube 86 encircles the rod 90 for that tube 86 and extends between the guide tab 80 at the lower end of the tube 86 and collar 92 on that rod 90. At their upper ends, the rods 90 are turned laterally, and these laterally directed portions project through the tabs 72 that project rearwardly from the back wall 60 of the movable section 38, thereby forming a pivotal connection between the upper section 38 and the rods 90.

As the movable section 38 swings upwardly and rearwardly away from its extended position, the tabs 72 move downwardly and force the rods 90 into the tubes 86. As a consequence, the collars 92 move downwardly in their respective tubes 86 and compress the springs 88. Thus, when the movable section 38 is in its carrying position, the springs 88 are compressed, so as to exert a force which tends to restore the movable section 38 to its extended position, and this force is particularly effective as the movable section 38 moves upwardly out of its carrying position to the over-center position for the section 38.

The locking mechanisms 42 secures the movable section 38 to the fixed section 36 when the former is in its extended position, so that it will not be inadvertently displaced from that position. The mechanism 42 is for the most part mounted on the front wall 56 of the upper section 38, but does include a keeper 94 (FIGS. 2-4) which is attached to the front wall 44 of the lower section 36 midway between the sides of that wall. The keeper 94 projects forwardly from the front wall 44 at the upper margin of that wall. When the locking mechanism 42 secures the movable section 38 to the fixed section 38, the keeper 94 is engaged by a latch 96 that is on the end of an actuating rod 98 which extends along the front wall 56 of the movable section 38 slightly above the lip 62 at the bottom of that wall, the rod 98 being retained in sleeves 100 that are attached to the front wall 56. At its outer end, which is along one side of the front wall 56, the rod 98 turns forwardly to form a handle 102 by which one can turn the rod 98 and thereby rotate the latch 96 on it.

The latch 96 has a rearwardly opening slot 104 (FIG. 2) which is large enough to receive the keeper 94. While the lower margin of the slot 104 is straight, the upper margin curves away from the lower margin such that the open end of the slot 104 is somewhat larger than the closed end. This enables the latch 96, when turned by the rod 98 in the correct direction, to completely clear the keeper 94. When the latch 96 is so disposed, it no longer engages the keeper 94 and the movable section 38 may be lifted upwardly and swing to its carrying position.

In use, the transport vehicle A is normally loaded with the hopper 30 for the mixer unit 4 in its extended configuration. In that configuration the movable section 38 of the hopper 30 is located directly above the fixed section 36, and in effect constitutes a funnel-like extension of the fixed section 36. As such, concrete mix which is directed into the movable section 38, is channelled to the fixed section 36 and from there into the entry spout 52 which directs it into the opening 9 at the end of the drum 8, or more specifically into the cone 14 within that opening. Once loaded, the vehicle A may be driven to a construction site with the movable section 38 in its extended position. To hold the movable section 38 in this position during operation of the vehicle A, the handle 102 on the end of the actuating rod 98 should be turned downwardly so that its latch 96 engages the keeper 94. Similarly, the concrete may be unloaded at the construction site with the movable section 38 in its extended position.

On the other hand, if the overhead clearance at the loading facility or at the construction site or along the route between the two is restricted, then the movable section 38 should be moved to its storage position. This is achieved by merely turning the handle 102 on the end of the actuating rod 98 so that the latch 96 disengages the keeper 94. The movable section 38 is then lifted upwardly, swung over-center, and allowed to descend into its storage position at the rear of the fixed section 36. The counterbalancing assembly 40 arrests the descent, for as the movable section 38 is lowered, the springs 88 compress and exert a restoring force on the movable section 38. In any event, when the movable section 38 reaches its carrying position, its back wall 60 will bear against the carrier plate 74 for the counterbalancing assembly 40.

The mixer unit 4 may be loaded with its hopper 30 in the storage configuration, in which case the mix is merely directed into the fixed section 36. Moreover, when the hopper 30 is in its storage configuration, the vehicle A has minimum height, and if the mixer unit 4 is of small capacity, the vehicle A can maneuver in areas where the overhead clearance is low—too low to accommodate mixers of large capacity.

The hopper 30 is easily converted back to its extended configuration merely by grasping the movable section 38 and lifting it so that it swings upwardly about the axis of the hinge pin 68. The springs 88 assist so the operator does not act against the full weight of the movable section 38. Once the movable section 38 reaches an over-center position, it merely descends under its own weight to the extended position on top of the fixed section 36. Then the latch 96 should be turned into engagement with the keeper 94.

This invention is intended to cover all changes and modifications of the example of the invention herein chosen for purposes of the disclosure which do not constitute departures from the spirit and scope of the invention.

What is claimed is:

1. In combination with a mixer unit for a concrete transport vehicle, said mixer unit including a frame, a drum mounted on the frame for rotation relative to the frame, the drum having one of its ends elevated above the other of its ends with the elevated end being open for introducing concrete mix into and discharging it from the drum, and a discharge chute mounted on the frame and extending away from the open end of the drum; an improved hopper for directing concrete mix into the elevated open end of the drum, said hopper comprising: a fixed section of rigid shape mounted on the frame in a fixed position with respect thereto and being open at its top and at its bottom, with the open top being located externally of the drum and being presented directly upwardly and with the open portion of the bottom facing and opening into the elevated open end of the drum; and a movable section of rigid shape located externally of the drum and having opposite ends that are open, the movable section being capable of moving from an extended position to a storage position with respect to the fixed section, the movable section when in its extended position having one of its ends at the open top of the fixed section and forming an upwardly directed continuation of the fixed section to in effect extend the height of the hopper, the movable section when in its storage position being located such that the open top of the fixed section is generally unobstructed and constitutes the highest portion of the hopper.

2. The structure according to claim 1 wherein the movable section and the fixed section are connected to each other at a hinge joint and the movable section moves relative to the fixed section about the axis of the hinge joint.

3. The structure according to claim 2 wherein the hinge axis about which the movable section moves with respect to the fixed section is located along a portion of the fixed section that is opposite from the open end of the drum so that the fixed section is interposed between the movable section and the open end of the drum when the movable section is in its storage position.

4. The structure according to claim 3 wherein the fixed section has an upper margin that lies in a generally horizontal plane, and the movable section has upper and lower margins that also lie in generally horizontal planes when the movable section is in either its extended position or its storage position.

5. The structure according to claim 4 wherein the fixed section has a front wall that is presented toward the open end of the drum and a back wall that is presented away from the open end of the drum and is spaced from the front wall, the back wall of the fixed section further being inclined; wherein the movable section has front and back walls that align with the front and back walls of the fixed section when the movable section is in its extended position; and wherein the back wall of the movable section is presented toward and is generally parallel to the back wall of the fixed section when the movable section is in its storage position.

6. The structure according to claim 2 wherein the two sections are funnel-shaped.

7. The structure according to claim 2 and further comprising counterbalancing means for exerting a force on the movable section when that section is in its storage position, the force being directed such that it urges the movable section toward its extended position.

8. The structure according to claim 7 and further comprising locking means for securing the movable section in its extended position, the locking means being releasable.

9. The structure according to claim 1 wherein the fixed section has a spout extending from its open lower end into the drum at the open end of the drum.

10. A mixer unit for a concrete transport vehicle, said mixer unit comprising: a frame; a drum supported on the frame such that it rotates relative to the frame about an axis that is inclined with respect to the horizontal, whereby one end of the drum is higher than the other end, the drum having an opening at its higher end, with the opening being circular and concentric to the axis of rotation for the drum; a discharge chute extending away from the opening in the elevated end of the drum; and a hopper supported on the frame for directing concrete into the drum, the hopper including a first section that is supported in a fixed position on the frame and has an open top that is presented directly upwardly outside of the drum, the first section being rigid in shape and also being open near its bottom with that portion of the first section being presented toward and opening into the opening at the elevated end of the drum, the hopper further including a second section which is rigid in shape and is open at both of its ends, the second section being located externally of the drum and further being hinged to the first section such that the second section is capable of moving between extended and storage positions, the second section when in its extended position forming an upward extension of the first section with one open end of the second section being at and generally coinciding with the open top of the first section, the second section when in its storage position being offset with respect to the first section and being at an elevation below the open top of the first section.

11. A mixer unit according to claim 10 wherein the hinge axis of the hopper is parallel to the opening at the elevated end of the drum.

12. A mixer unit according to claim 10 wherein both the first and second sections of the hopper are funnel-shaped.

13. A mixer unit according to claim 10 wherein the first and second sections have front and back walls and side walls extended between the front and back walls, the front wall of the first section being vertical and the back wall being inclined, the front wall of the second section, when that section is in its extended position, being vertical and forming a vertical continuation of the front wall on the first section while the back wall of the second section is inclined and forms an inclined continuation of the back wall on the first section.

14. A mixer unit according to claim 13 wherein that wall of the second section which forms the front wall of the second section when the second section is in its extended position is also vertical when the second section is in its storage position, and wherein that wall of the second section which forms the back wall of the second section, when that section is in its extended position, faces and is generally parallel to the back wall of the first section when the second section is in its storage position.

* * * * *